Patented Jan. 8, 1952

2,581,840

UNITED STATES PATENT OFFICE 2,581,840

INSECT REPELLENT

Nathan L. Drake, College Heights, Md., and Charles M. Eaker, Affton, Mo., assignors to the United States of America as represented by the Secretary of the Army No Drawing. Application January 11, 1949, Serial No. 70,393

3 Claims. (Cl. 167—30)

This invention relates to insect repellents.

We have found that the application of the ethyl ester of 6-ethyl-2-methyl-4-oxo-2-cyclohexene-1-carboxylic acid, a compound having a structural formula

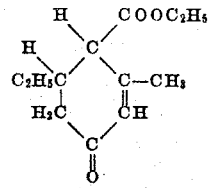

to the human skin or to a fabric affords effective protection against insect bites, by repelling insects, particularly Aedes aegypti and Anopheles quadrimaculatus.

A number of tests to measure the repellency of the ethyl ester of 6-ethyl-2-methyl-4-oxo-2-cyclohexene-1-carboxylic acid against Aedes aegypti was conducted by smearing the compound on the arms of the test personnel, who then thrust their arms into cages containing Aedes aegypti. The arms were exposed for 30-minute intervals at 3 minutes each until the first insect bite.

Tests to measure the repellency of impregnated fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of the ethyl ester of 6-ethyl-2-methyl-4-oxo-2-cyclohexene-1-carboxylic acid affords protection against Aedes aegypti for an average of 208 minutes. Against Anopheles quadrimaculatus, an average repellency time of 41 minutes was noted in analogous tests.

It was found that fabric impregnated with the ethyl ester of 6-ethyl-2-methyl-4-oxo-2-cyclohexene-1-carboxylic acid remained repellent against Aedes aegypti for over 10 successive days.

The ethyl ester of 6-ethyl-2-methyl-4-oxo-2-cyclohexene-1-carboxylic acid may be prepared as follows:

102 ml. (105 gms.; 8 mol) ethyl acetoacetate are placed into a 250 ml. flask, and the flask is cooled in an ice salt mixture. 21 gms. (.35 mol) of proprionaldehyde are added and the mixture is cooled to 0° C. About 1 ml. of pyridine in about 2 ml. of absolute alcohol are added, whereupon a reaction between the two first-named reactants takes place. After the reaction subsides, the flask is placed in a refrigerator, and about 1 ml. of piperidine in about 2 ml. of absolute alcohol are added each morning for three days. The resulting intermediate product, diethyl propylidene bisacetoacetate, is then added to an excess of acetic acid in the presence of sulfuric acid are refluxed for about 1 hour. The reaction mixture is then worked up as before. The yield is a yellow liquid, slightly soluble in water, boiling at 105 to 106° C. at a pressure of .5 mm., refractive index: $n_D^{22.8} = 1.4810$.

The preparation of the intermediate product, diethyl propylidene bisacetoacetate, may be graphically represented as follows:

$2CH_3COCH_2COOC_2H_5 + CH_3CH_2CHO \longrightarrow$

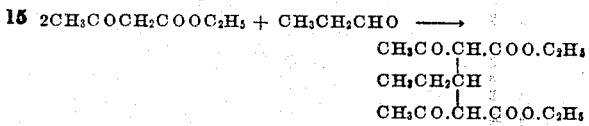

For ease of application to the skin, the ethyl ester of 6-ethyl-2-methyl-4-oxo-2-cyclohexene-1-carboxylic acid may be incorporated in a suitable inert liquid or solid carrier such as mineral oil, alcohol, petrolatum, etc. For ease and uniformity of application to the fabric, the ethyl ester of 6-ethyl-2-methyl-4-oxo-2-cyclohexene-1-carboxylic acid may be applied to the fabric in an inert solvent, such as alcohol, ether, etc.

Having thus described our invention, we claim:

1. An insect-repellent fabric comprising fabric impregnated with the ethyl ester of 6-ethyl-2-methyl-4-oxo-2-cyclohexene-1-carboxylic acid.

2. A process of repelling insects, comprising applying the ethyl ester of 6-ethyl-2-methyl-4-oxo-2-cyclohexene-1-carboxylic acid to the region from which the insects are to be repelled.

3. A process of repelling insects, comprising applying the ethyl ester of 6-ethyl-2-methyl-4-oxo-2-cyclohexene-1-carboxylic acid to the skin.

NATHAN L. DRAKE.
CHARLES M. EAKER.

REFERENCES CITED

The following references are of record in the file of this patent:

UNITED STATES PATENTS

| Number | Name | Date |
| --- | --- | --- |
| 2,400,006 | Jones et al. | May 7, 1946 |

OTHER REFERENCES

Horning et al.: Preparation of 4-Carbothoxy . . . -1-Ones from Chemical Abstracts, 1945, vol. 39, page 1145.

OSRD Insect Control Committee Report No. 16, Interim Report No. 0–87, February 1, 1945. Particularly page 68, 0–2000, 6-cycloxexyl-delta-2-hexenoic acid, methyl ester.